United States Patent [19]
Wakabayashi

[11] Patent Number: 5,510,867
[45] Date of Patent: Apr. 23, 1996

[54] CAMERA PREVENTING LOADING OF EXPOSED CARTRIDGE

[75] Inventor: Tsutomu Wakabayashi, Kanagawa, Japan

[73] Assignee: Nikon Corporation, Tokyo, Japan

[21] Appl. No.: 354,792

[22] Filed: Dec. 12, 1994

[30] Foreign Application Priority Data

Dec. 20, 1993 [JP] Japan .................................. 5-320460

[51] Int. Cl.$^6$ .................................................. G03B 19/02
[52] U.S. Cl. ........................................... 354/207; 354/288
[58] Field of Search .............................. 354/21, 202, 207, 354/212, 214, 275, 288

[56] References Cited

U.S. PATENT DOCUMENTS

| | | | |
|---|---|---|---|
| 4,832,275 | 5/1989 | Robertson | 354/275 X |
| 4,994,828 | 2/1991 | Smart | 354/21 |
| 4,994,833 | 2/1991 | Cocca | 354/207 |
| 5,307,099 | 4/1994 | Kawamura et al. | 354/207 X |

FOREIGN PATENT DOCUMENTS

| | | |
|---|---|---|
| 4-76526 | 3/1992 | Japan . |
| 5-107633 | 4/1993 | Japan . |

*Primary Examiner*—Howard B. Blankenship
*Attorney, Agent, or Firm*—Oliff & Berridge

[57] ABSTRACT

A camera includes a cartridge chamber for holding a film cartridge having a film usage indicator. An ejection member can eject the loaded cartridge from the cartridge chamber by at least a fixed amount. A loading prevention member projects and retracts from the cartridge chamber and when projecting prevents loading of a film cartridge with used film, stopping the film cartridge a first fixed amount from its fully loaded position. The loading prevention member retracts from the cartridge chamber to allow loading when a film cartridge with new film is loaded and returns to the projected position when the loaded cartridge is ejected a fixed amount. In a refinement, an operation completion detection switch cooperates with a cartridge chamber lid switch to help prevent double exposures by preventing feeding of film until the film cartridge has been ejected a second fixed distance from the fully loaded position.

20 Claims, 10 Drawing Sheets

CAMERA PREVENTING LOADING OF EXPOSED CARTRIDGE

BACKGROUND OF THE INVENTION

1. Field of the Invention

The present invention relates to a camera into which a cartridge capable of distinguishing and indicating the usage state of the film may be loaded, and, in particular, to a camera that prevents the loading of a film cartridge that distinguishes and indicates that the film is used.

2. Description of Related Art

Japanese Laid-Open Patent Application No. 5-107633 discloses a film cartridge (referred to hereafter simply as "cartridge") capable of distinguishing and indicating the film usage state and a camera into which this cartridge can be loaded. The film usage state indicates whether there are no frames that have been photographed yet (unused film), whether the film has been taken out with only some of the frames photographed (partially used film), or whether all frames of the film have been photographed (completely used film).

In addition, the camera shown in the Japanese publication is equipped with a mechanism that prevents the loading of a cartridge that contains completely used film. This camera has a cartridge chamber into which a cartridge may be loaded by insertion in the axial direction. A loading prevention pin can project into the cartridge chamber or be withdrawn from the projected position. When a cartridge that indicates that the film is completely used is inserted into the cartridge chamber, the loading prevention pin stays in the projected position and prevents the loading of the cartridge. When cartridges that indicate film other than completely used film are being inserted into the cartridge chamber, the pin is withdrawn from the cartridge chamber and loading of the cartridge is allowed. The loading prevention pin is arranged so as to return to the projected position when the loaded cartridge is at least partially ejected (i.e., A mechanism may be provided that partially ejects the cartridge in the axial direction by hand operation to facilitate the removal of the cartridge from the cartridge chamber. However, if the cartridge is not ejected by a sufficient amount by this type of ejection mechanism, the loading prevention pin will not move to the projected position, and the film cartridge containing completely used film may be accidentally reloaded into the cartridge chamber. With an initial feed-type camera that automatically feeds the film upon occurrence of the film cartridge lid-closing action after the film has been loaded, the film of such a film cartridge that has been only partially ejected by the ejection mechanism and accidentally reloaded, will be initially advanced even if it contains completely used film, thereby resulting in the possibility of a double exposure.

With such a camera, even if the photographer notices the mistake of accidentally reloading the used film, the automatic feeding operation will occur, and the photographer will have to wait until a rewinding operation is performed before removing the film cartridge.

SUMMARY OF THE INVENTION

An object of the present invention is to provide a camera that minimizes the effort and time required to take out the cartridge and that prevents double exposure of the film.

A camera according to embodiments of the present invention includes a cartridge chamber for holding a film cartridge equipped with a film usage state indicator. The film cartridge may be inserted in the axial direction into the cartridge chamber. The camera also includes an ejection member that can eject the loaded cartridge from the cartridge chamber beyond a fixed amount, allowing a loading prevention member that can project into or be retracted from the cartridge chamber to project into the cartridge chamber and prevent loading of the cartridge when a film cartridge with used film is inserted. The loading prevention member is retracted from the cartridge chamber by loading a cartridge with new film (unused film, or at least partially used film) into the cartridge chamber within a fixed amount of the fully loaded position.

Embodiments of the invention also comprise a cartridge chamber and a driving mechanism that feeds the film of the loaded cartridge. A signal outputting device outputs an "un-removed" signal, such as by a switch, when the amount of ejection of the film cartridge from the cartridge chamber is less than a second fixed amount from the fully loaded position. The second fixed amount of ejection is at least as much as the fixed amount by which the cartridge needs to be ejected in order to cause the loading prevention member to return to the projected position. Preferably, the second fixed amount is greater than the fixed amount of ejection that causes the loading prevention member to return to the projected position. A "removed" signal is output, such as by a switch switching off, when the cartridge is ejected the second fixed amount. A regulating device such as a regulating circuit prevents the film feeding action by the driving mechanism after rewinding of the film until the signal outputting device changes from an "un-removed" signal output state to a "removed" signal output state, thus permitting the feeding action of the film, which only occurs with the signal outputting device changed to a "removed" signal output state.

A completely used cartridge may be ejected a first fixed amount from the fully loaded position in the cartridge chamber by the ejection mechanism, which is just a large enough distance to allow the loading prevention member to move to the projected position inside the cartridge chamber. Then, the completely used cartridge cannot be reloaded into the cartridge chamber. However, the loading prevention member does not return to the projected position if the ejection amount is less than the first fixed amount. In that case, it is possible that the cartridge may be accidentally reloaded. However, since the signal outputting device does not, in this case, change from the "un-removed" signal output state to the "removed" signal output state as by, for example, an operation completion switch remaining off, the film feeding action of the driving mechanism will not occur even if the cartridge is reloaded. Accordingly, double exposure of the film is prevented.

BRIEF DESCRIPTION OF THE DRAWINGS

The invention will be described in conjunction with the following drawings in which reference numerals designate like elements and wherein.

DETAILED DESCRIPTION OF PREFERRED EMBODIMENTS

An embodiment of the present invention operates as follows, with reference to FIGS. 1–9.

Figure 2A:
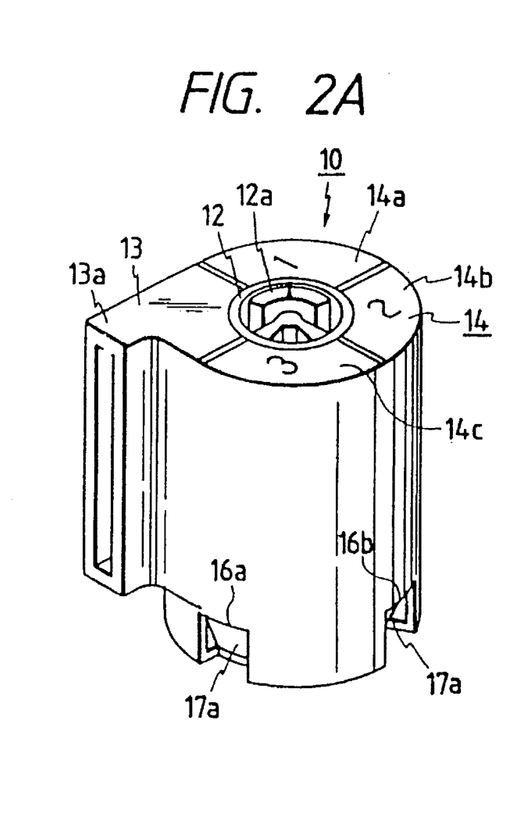
FIGS. 2A, 2B and 2C show oblique views of a film cartridge used in embodiments of the invention at different states of film usage.
Figure 2B:
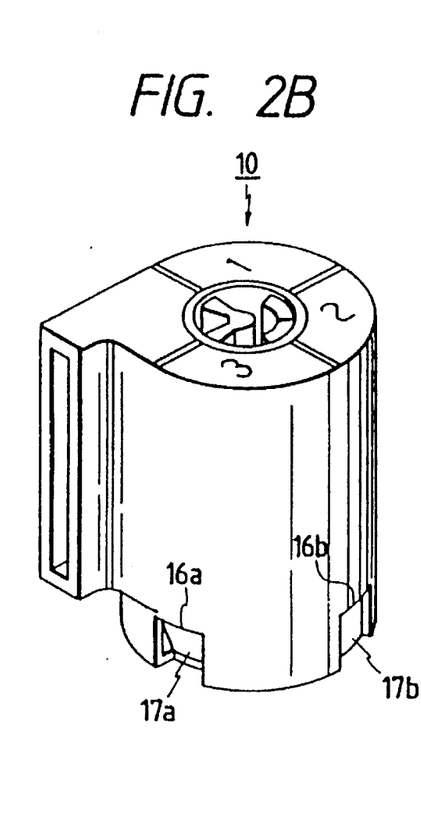
Figure 2C:
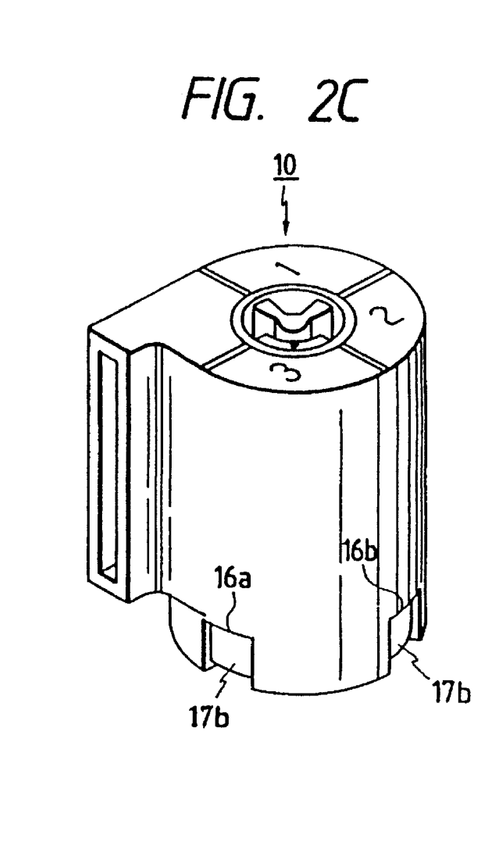

FIGS. 2A, 2B, and 2C show a film cartridge 10 that can be loaded into a camera of the present invention, the cartridge 10 being comprised of the same form as that of U.S. Pat. No. 4,832,275, the disclosure of which is incorporated herein by reference. Cartridge 10 comprises a spool 12 defining an axis around which the film (not shown) is wound and a canister body 13 that forms an empty space in which the film (not shown) is stored, a protruding lip portion 13a being provided on the canister body 13. The leading end of the film is taken into the cartridge 10 from the beginning, and the film is fed or rewound from the lip portion 13a by the rotation of the spool 12.

Also, as with the cartridge disclosed in Japanese Laid-Open Patent Application No. 4-76526, a mechanism is provided in the cartridge 10 that indicates and distinguishes the film usage state of the film, including a film usage state indication display component 14. As shown in FIGS. 2A–2C, the top end surface of the cartridge 10 is radially divided into four portions, three of which contain display symbols 14a ("1"), 14b ("2"), and 14c ("3"), which are printed or otherwise attached to the surface and which indicate the usage state of the film in the cartridge 10. An indicator mark 12a is provided and rotates in accordance with the movement of the spool 12. The indicator mark 12a is arranged so as to point to any of the regions 14a, 14b, or 14c through the rotation stopping position of the spool 12 to indicate one of the three usage states of the film.

When the display symbol 14a ("1") is indicated (FIG. 2A), the film is completely new and unused (not yet exposed); when display symbol 14b ("2") is indicated (FIG. 2B), one or more (but not all) of the frames of the film have been photographed and the film has been taken out of the camera before exposing all frames; when display symbol 14c ("3") is indicated (FIG. 2C), the film has been completely used and all frames have been photographed.

With the embodiment described below, the action of the spool 12 is regulated by the camera so that the indication will be "2" when the film is taken out before exposing all frames, and so that the indication will be "3" when all the frames have been photographed and the rewinding instruction is output. Thus, if the user takes the cartridge out of the camera, he or she can know the usage state of the film through the indication on the cartridge. In place of the display numerals "1", "2", and "3," characters such as "unused", "partially used", or "completely used" or other symbols or numbers may be used as the display symbols 14a, 14b, and 14c.

As with the device disclosed in Japanese Laid-Open Patent Application No. 4-76526, the cartridge 10 alone keeps the film usage state display from shifting, and allows the usage state display to move when the cartridge is loaded into the camera. Furthermore, a film information component, such as a commonly known DX code or the like, is provided within the canister body 13, and allows the detection of film sensitivity, the number of frames that can be photographed, and the like.

Figure 3:
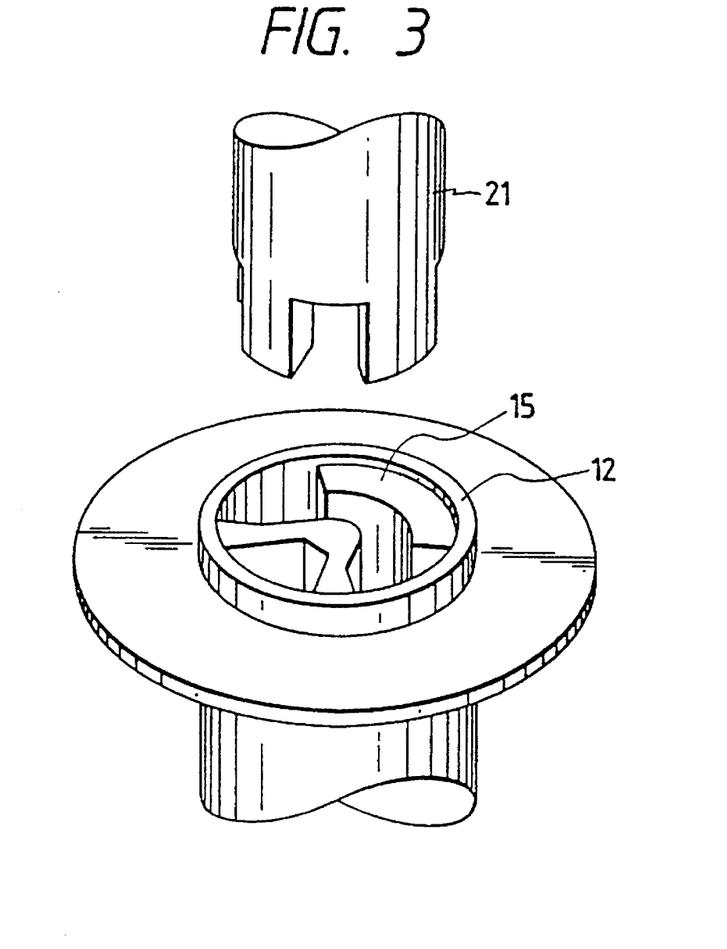
FIG. 3 shows an oblique view of the connection component of the cartridge spool and of the driving component.
Figure 4A:
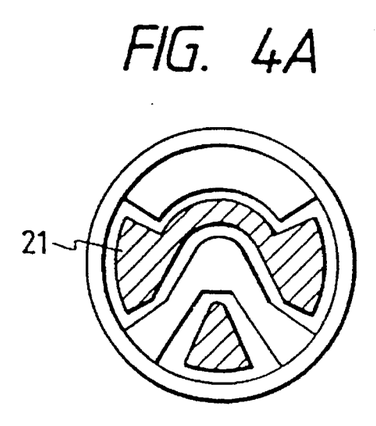
FIGS. 4A and 4B show the connection of the connection component and driving component at different relative rotational positions.
Figure 4B:
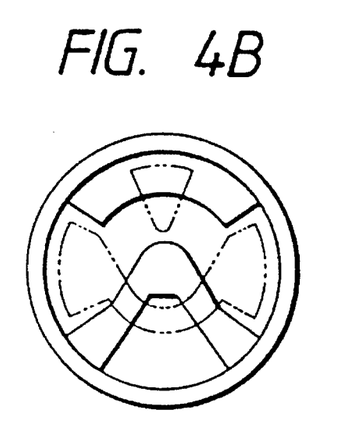

FIG. 3 and FIGS. 4A–4B show the connection component 15 provided on the spool 12 of the film cartridge 10 described above and the camera-side driving component 21 that connects to the connection component 15. The disclosed cartridge does not use splines such as are used on normal 135-model cartridges, but uses instead a distinctive shape as shown in the drawings. In contrast to the 135-model splines on which two relative positions of connection component and driving component 180° apart are possible, the construction of the cartridge is such that connection is only possible in the position shown in FIG. 4A. Connection components 15 are formed in the top and bottom of the spool 12 at the same rotary position. Rotation of the spool and feeding of the film becomes possible through the connection of the driving component 21 of the camera with connection component 15. FIG. 4B shows the spool rotated 180 degrees from the position shown in FIG. 4A so that the components cannot connect.

The reason that the construction is such that connection is possible for only one relative position of the components is as follows.

As described above, the spool 12 is regulated so as to stop at a position in accordance with whether the film has been removed after no use, partial use, or complete use after the film has been completely rewound. However, since this regulation is carried out after the rotary position of the driving component 21 of the camera has been detected, if connections were possible in two relative positions of the components, as with a 135-model spline, the spool 12 could not be regulated so as to stop at the unique position because the relative positions of the components would not be unique.

As shown in FIGS. 2A–2C, two window components 16a and 16b are formed in the bottom portion of the cartridge 10 at roughly 90 degrees to each other, exposing a connection surface component 17 comprising part of the film usage indicator that is formed at the bottom of the spool 12 and that rotates as a single body. The connection surface component 17 comprises slanted surfaces 17a on one half the circumference of the component and non-slanted surfaces 17b on the other half of the circumference of the component, the slanted surfaces 17a and non-slanted surfaces being selectively exposed through the window components 16a and 16b according to the stopping position of the spool 12, indicating the film usage state, as follows:

(1) in state "1," slanted surfaces 17a are exposed through both window components 16a and 16b;

(2) in state "2," a slanted surface 17a is exposed through window component 16a and a non-slanted surface 17b is exposed through window component 16b;

(3) in state "3," non-slanted surfaces are exposed through both window components 16a and 16b.

Figure 1:
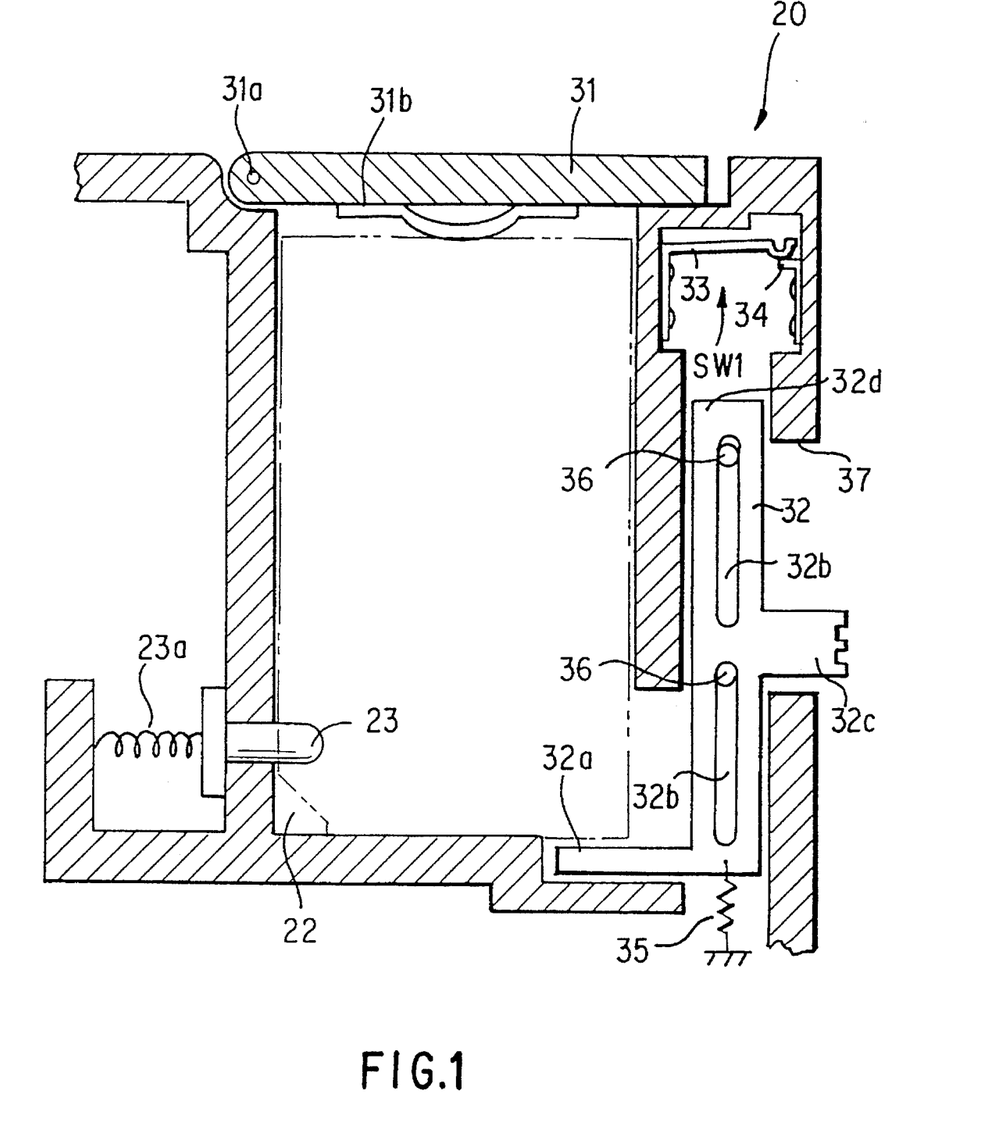
FIG. 1 shows a cross section in the vicinity of the cartridge chamber in a camera according to an embodiment of the invention without a film cartridge loaded.
Figure 5:
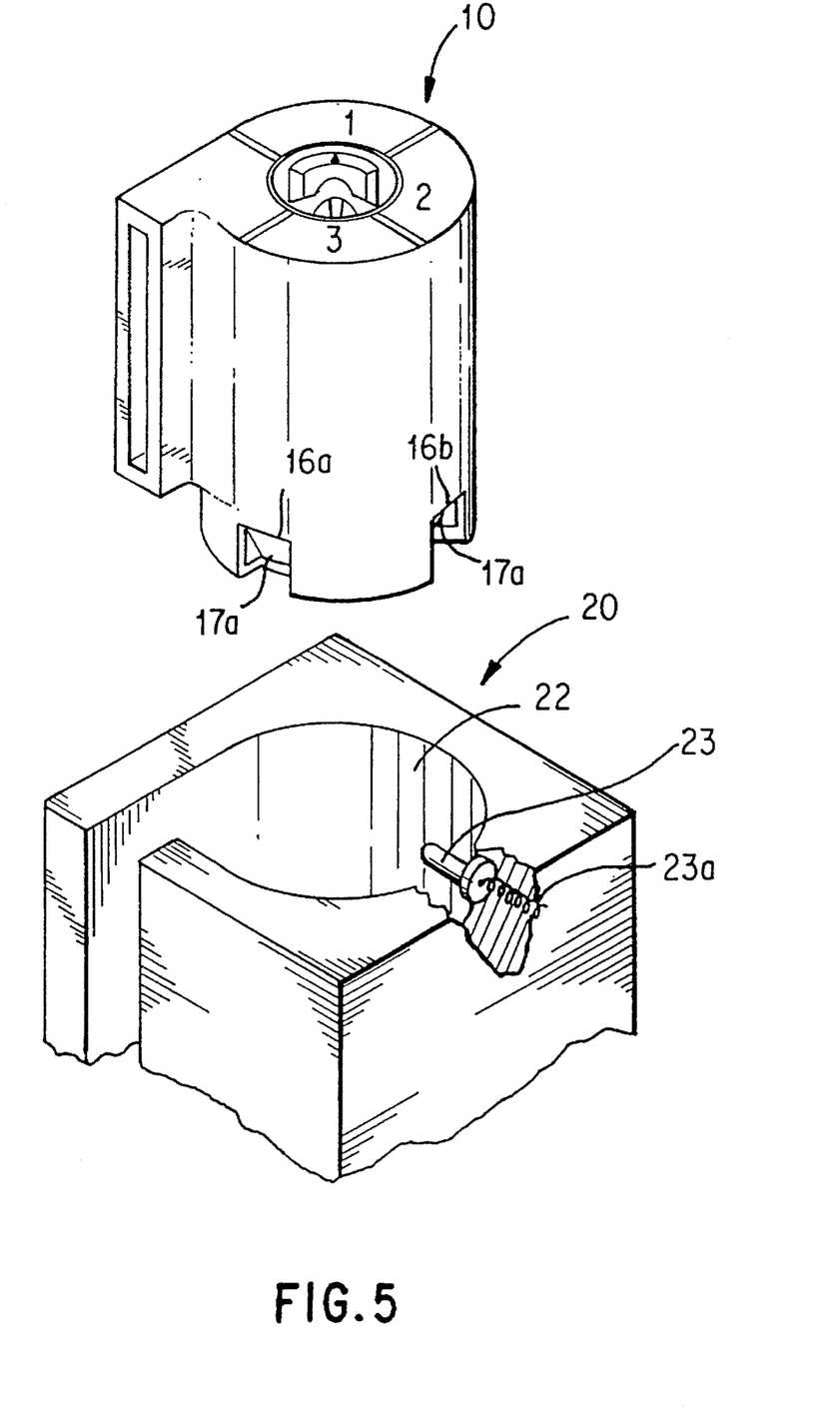
FIG. 5 shows an oblique view of the construction of the cartridge chamber according to an embodiment of the invention.
Figure 6:
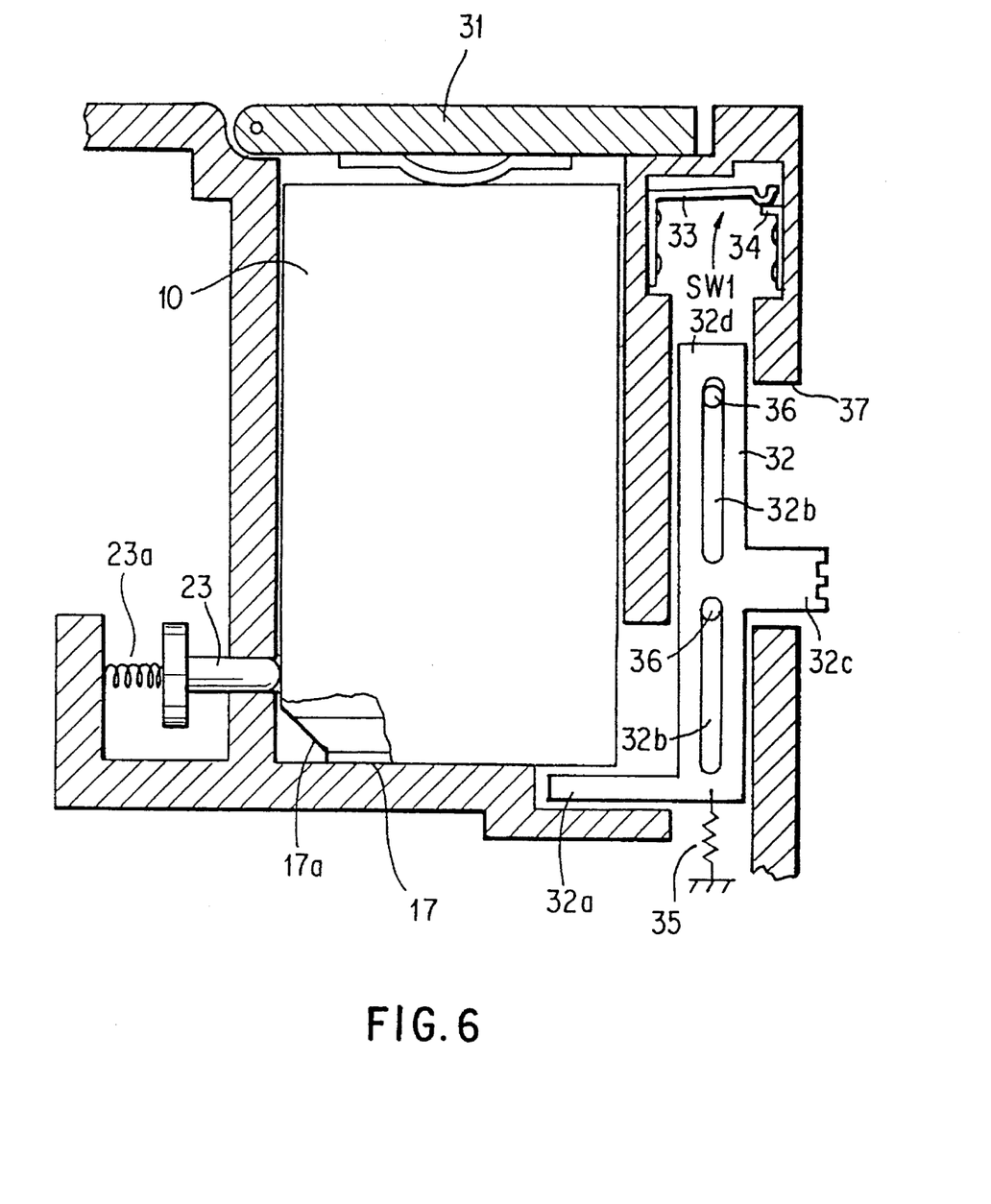
FIG. 6 shows a cross section of the cartridge chamber in a camera according to an embodiment of the invention with a film cartridge in a fully loaded position.
Figure 7:
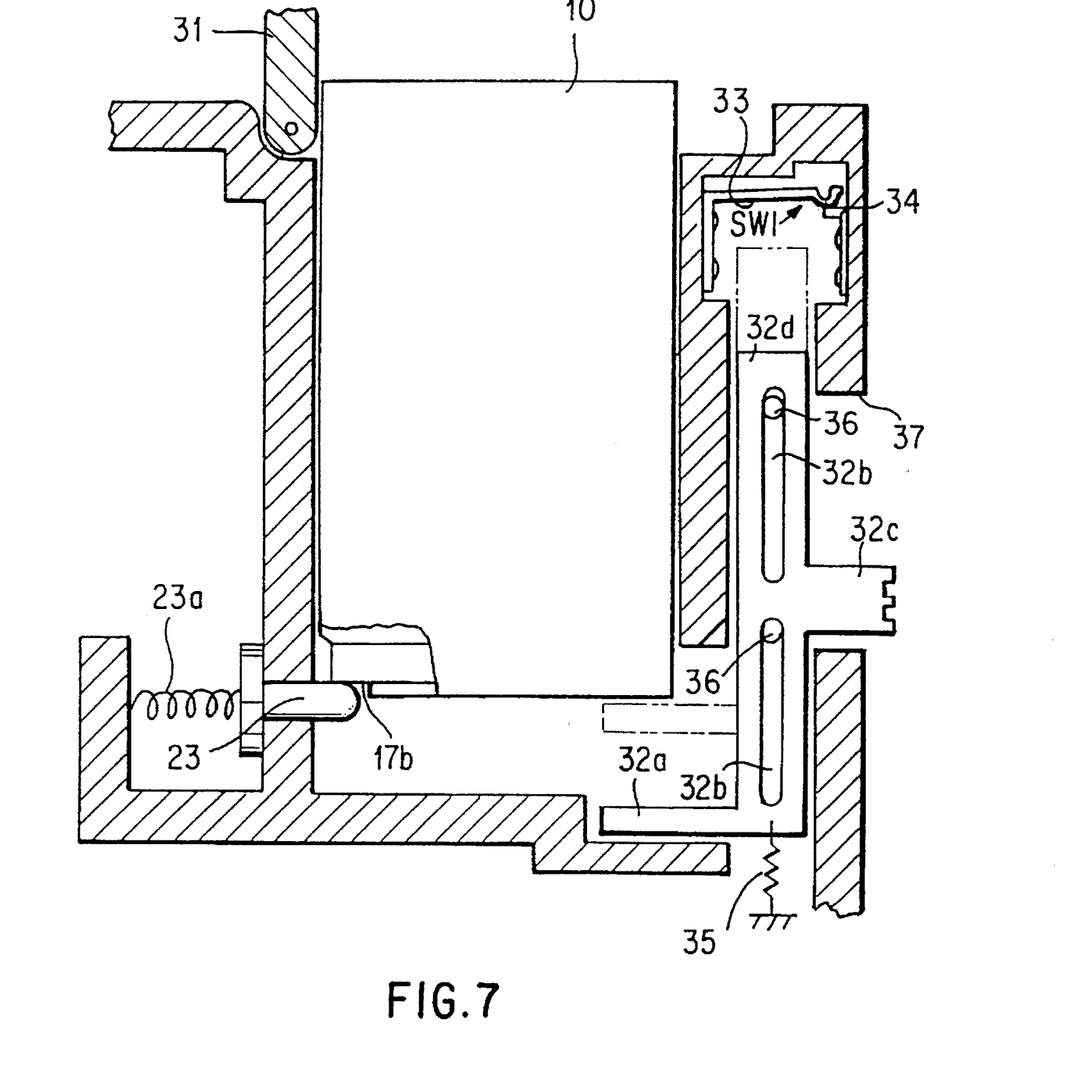
FIG. 7 shows a cross-section of the cartridge chamber in a camera according to an embodiment of the invention with/e film cartridge ejected a first fixed distance.

As shown in FIG. 1 and FIG. 5, a cartridge chamber 22 into which a film cartridge 10 including a spool 12 can be inserted in the axial direction so that the axis of spool 12 extends centrally from the open end to the closed end of the cartridge chamber is provided within the camera 20. A retractable loading prevention pin 23, pushed by a spring 23a, extends from the side surface of the cartridge chamber 22 into the cartridge chamber 22 where the window component 16b passes when a cartridge is loaded. The pin 23 extends in a direction perpendicular to the loading direction. Thus, when a slanted surface 17a is exposed through the window component 16b as shown in FIG. 6, the pin 23 retracts because of the camming action of the slanted surface 17a when the cartridge 10 is inserted and allows the film cartridge 10 to be loaded. When a non-slanted surface 17b is exposed through the window component 16b as shown in FIG. 7, the non-slanted surface 17b contacts the loading prevention pin 23 when the cartridge 10 is inserted and full loading of the cartridge is mechanically prevented with the film cartridge stopping a first fixed distance from the fully loaded position.

Thus, a completely used cartridge 10 displaying a "3" or a partially used cartridge 10 displaying a "2" cannot be loaded into the cartridge chamber 22; only a new cartridge displaying a "1" can be loaded. When a loaded cartridge 10 is pulled out past the pin 23 as shown in FIG. 7, the loading prevention pin 23 returns to the projected position through the force of the spring 23a.

As shown in FIG. 1, a cartridge lid 31 can be opened or closed relative to the camera body about axis 31a. The lid is held shut by a key component (not shown) on the front edge, and can be opened by removing the key component. A spring 31b is provided on the inner surface of the cartridge lid 31, which may press against a loaded film cartridge in the downward direction as shown in FIG. 1.

An L-shaped ejector lever 32 ejects the film cartridge from the cartridge chamber 22 and is accommodated in an empty space adjacent to the cartridge chamber in such a manner that the lever may move in the up and down direction of the camera. A set of guide pins 36 protruding from the camera body connect with a set of guide slots 32b provided on one leg of the L-shaped ejector lever 32. The raising and lowering of the ejector lever 32 is guided by the guide pins 36 and guide slots 32b.

An ejection component 32a, which comprises one leg of the L-shaped lever, protrudes into the cartridge chamber and extends from the bottom end of the ejector lever 32. The cartridge 10 in the cartridge chamber 22 may be ejected in the upward direction by this ejection component 32a. An operational component 32c is provided on the ejector lever 32 and protrudes outside the camera body through a window component 37. The lever 32 operates vertically through the hand operation of the operational component 32c.

The ejector lever 32 that is constructed in this manner is continually pulled (i.e., biased) downwardly as shown in FIG. I by a tension spring 35.

An operation completion detection switch SW1 comprising a set of contacts 33 and 34 is provided in the empty space above the ejector lever 32. The contacts 33 and 34 are affixed to the camera in such a way that the contacts 33 and 34 are biased toward contact so that the switch SW1 is normally on. The contact 33 is positioned within the range of movement of the ejector lever 32. When the ejector lever 32 is moved to the position shown in FIG. 8, the contact of contact point 33 with contact point 34 is broken by the upper end surface 32d of the lever, and switch SW1 is turned off.

Figure 8:
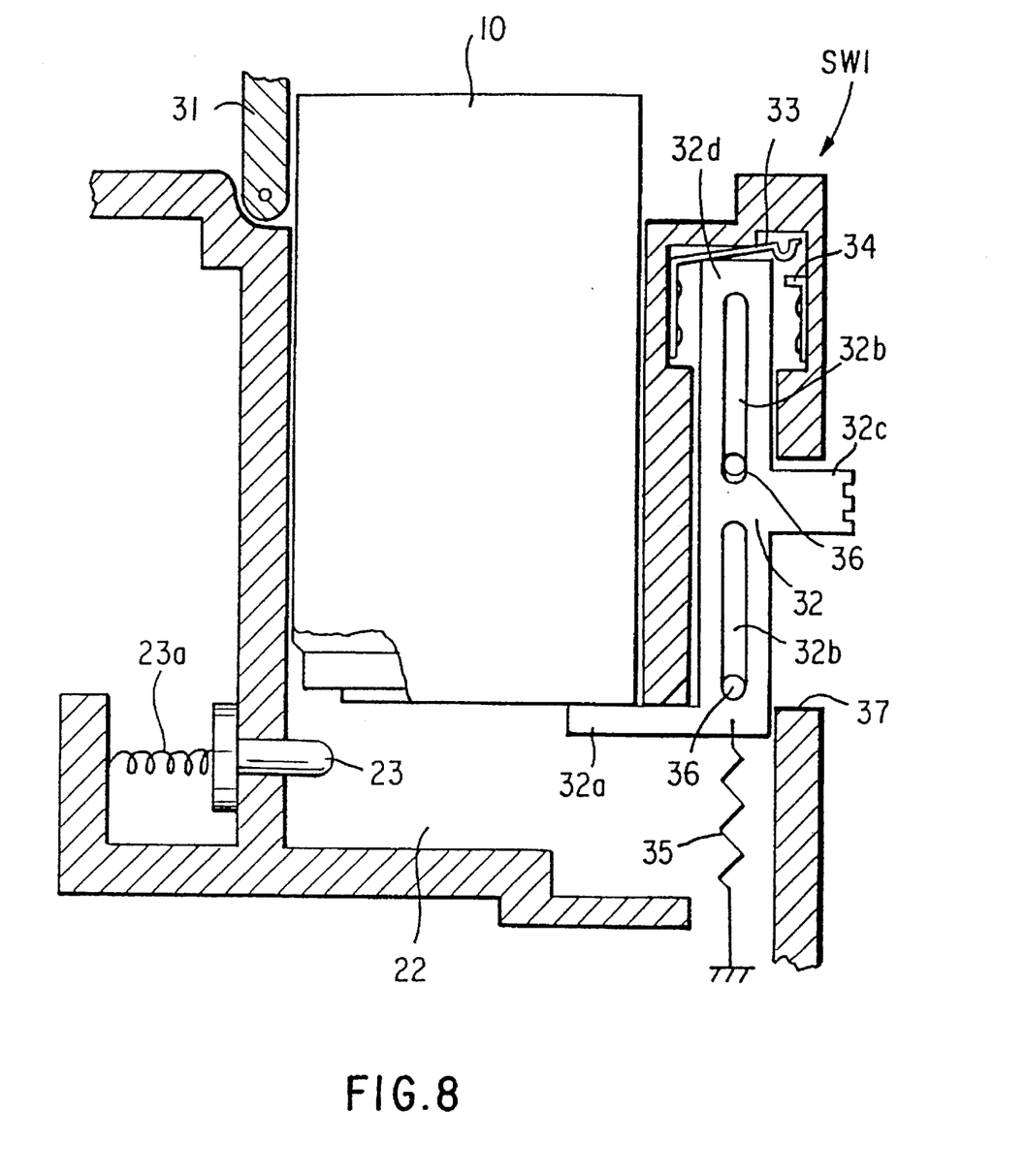
FIG. 8 shows a cross-section of the cartridge chamber in a camera according to an embodiment of the invention with the film cartridge ejected a second fixed distance.

Ejector lever 32 can be moved from a position in which the ejection component 32a is not in contact with the cartridge 10 (the position shown in FIG. 6), through a position at which the loading prevention pin 23 can return to the projected position shown by the dashed line in FIG. 7, and ultimately to a position that turns off the operation completion detection switch SW1 as shown in FIG. 8.

Figure 9:
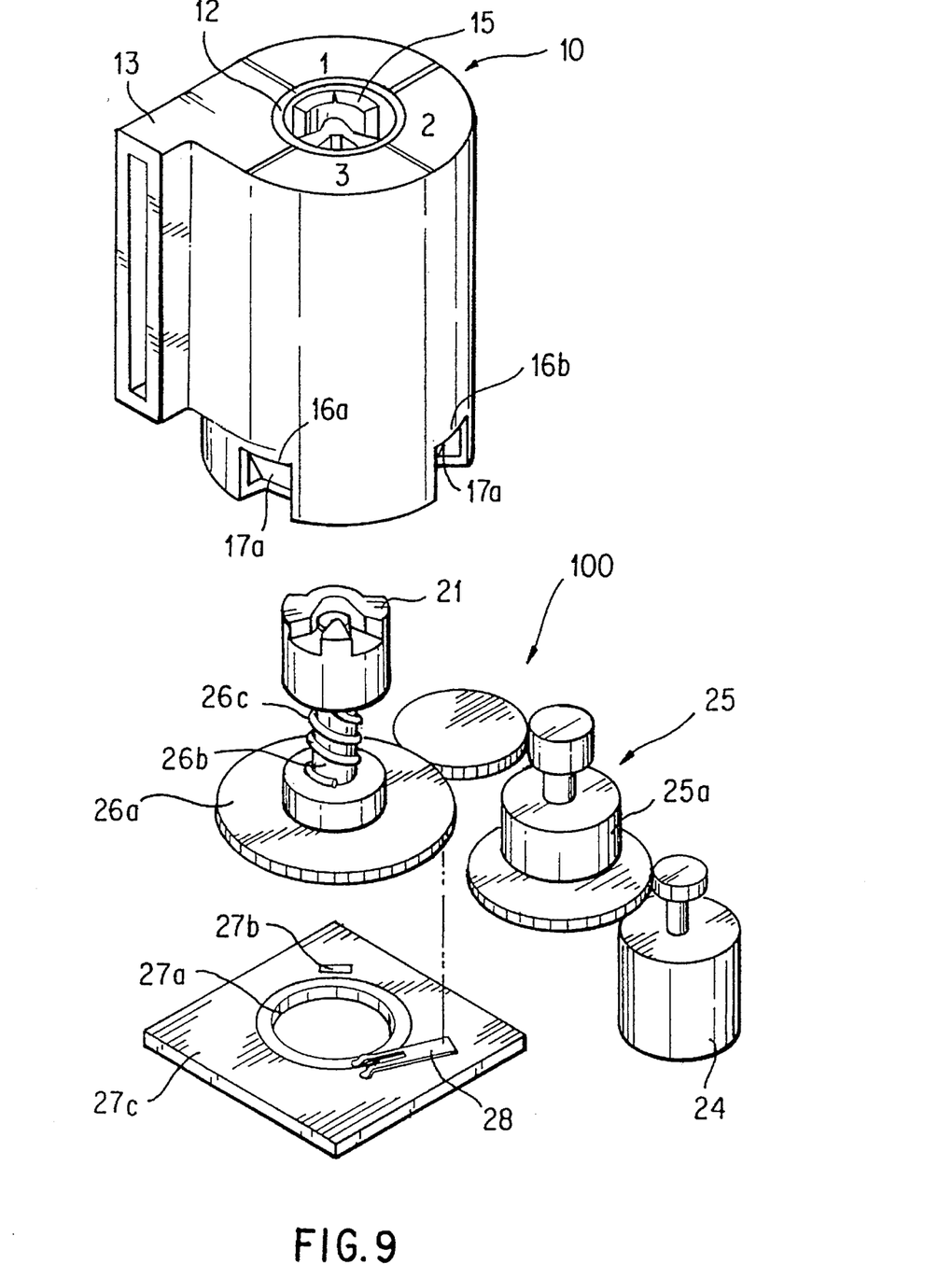
FIG. 9 shows an exploded, oblique view of a spool driving mechanism usable with the invention.

FIG. 9 shows the spool driving mechanism 100 of the camera 20 which regulates the film feeding and the rotation stopping position of the cartridge spool 12.

As shown in FIG. 9, the driving component 21 of the camera 20 connects with the connection component 15 at the bottom of the spool 12 and is rotationally driven by a cartridge driving motor 24. Specifically, the rotation of the motor 24 is transmitted through a speed-reduction gear wheel mechanism 25, which comprises a clutch 25a and gears, to the gear 26a, and gear 26a, shaft 26b, and driving component 21 rotate as a single unit. Through this rotation, the spool 12 of the cartridge 10 rotates, and the film is fed from the cartridge 10 and rewound to the cartridge 10.

Spring 26c forms a common withdrawing mechanism such that the cartridge 10 can be loaded even if the positions of the connection component 15 and the driving component 21 are shifted when the cartridge 10 is loaded. If the positions are shifted, the driving component 21 opposes the force of the spring 26c and withdraws along the shaft 26b in the downward direction. Even in this withdrawn position, the driving component 21 can rotate as one body with the gear 26a and the shaft 26b. Also, when the film is wound up on the rewinding spool (not shown) after the film has been fed by the rotation of the spool 12, the rotation transmission of the driving component 21 and the driving motor 24 by the clutch 25a is disconnected.

The rotary position of the driving component 21 is detected by conductor patterns 27a and 27b and a rubbing brush provided in the top of an insulated base plate 27c. The insulated base plate 27c is affixed to the inside of the camera 20, and the rubbing brush 28 rotates as one body with the driving component gear 26a. One end of the brush continually rubs against the top of conductor pattern 27a, and the other end can contact the conductor pattern 27b according to the position of driving gear 26a, or in other words, of the driving component 21. The rotary position of the driving component 21 at which the conductor pattern 27b and the rubbing brush 28 come into contact corresponds to the position at which the indicator mark 12a of the cartridge 10 indicates the display symbol 14c ("3"). Thus, if the conductor pattern 27a is grounded and the conductor pattern 27b is connected to the input port of a regulating circuit (not shown), connection between the rubbing brush 28 and the conductor pattern 27b indicates the driving component 21 is in the rotary position that corresponds to completely used film.

The loading prevention operation is as follows.

When an unused cartridge 10 is inserted into the cartridge chamber 22, the loading of the film cartridge 10 is permitted because the slanted surface 17a which is exposed through the window component 16b causes the loading prevention pin 23 to retract, allowing the film cartridge to be inserted to the fully loaded position as shown in FIG. 6. If the cartridge lid 31 is closed after loading the film cartridge 10, initial feeding of the film in the cartridge 10 is carried out by the spool driving mechanism 100 of FIG. 9, and photography may then be performed. If photography of all frames is completed, the film is rewound into the cartridge 10 by the spool driving mechanism 100 and the driving component 21 rotates until the contact of the conductor pattern 27b and the rubbing brush 28 is detected and the indicator mark 12a of the cartridge 10 indicates "3," which shows that the film is completely used up. At this point, a non-slanted surface 17b is exposed through the window component 16b.

After the cartridge lid 31 through which the used cartridge 10 is to be taken out has been opened, the cartridge 10 is ejected upwardly by the ejector component 32a when the operational component 32c is operated and the ejector lever 32 is slid in the upward direction of FIG. 7 in opposition to the force of the tension spring 35. When the ejector component 32a moves up past the point shown by the dashed lines in FIG. 7 (i.e., a first fixed distance) the loading prevention pin 23 moves outward into the cartridge chamber 22 through the force of the spring 23a because the cartridge 10 no longer contacts the front of the loading prevention pin 23. At this point, the operation completion detection switch SW1 is still on.

When the user's hand is removed from the operational component 32c of the ejector lever 32 after moving the lever to the position shown in FIG. 8, the ejector lever 32 returns to the position shown in FIG. 1 through the force of the spring 35. However, since the loading prevention pin 23 extends outwardly into the cartridge chamber 22, if reloading of the ejected cartridge 10 is attempted, a non-slanted surface 17b which is now exposed through the window component 16b interferes with the loading prevention pin 23 and prevents the reloading of the ejected cartridge 10 as shown in FIG. 7. Thus the problem of ejecting the cartridge again with the ejector lever 32 is eliminated, usability is improved, and initial feeding of a completely used cartridge will not be carried out again, thus preventing double exposure.

The component 17 and at least window 16b function as a film usage indicating means, the ejector lever 32 functions as an ejection means, and the loading prevention pin 23 functions as a loading prevention means.

While the embodiment was described for a completely used cartridge taken out of the cartridge chamber 22, since a partially used cartridge also exposes a non-slanted surface 17b through the window component 16b, reloading of a partially used cartridge will be prevented in the same way as with the completely used cartridge. If the camera is equipped with a function that performs photography on a partially used cartridge without double exposing the film, the embodiment may be constructed so as to allow reloading of a partially used cartridge. In that case, window component 16a, rather than window component 16b, may be used as part of the film usage indicating means.

Reloading of the cartridge is prevented if the ejector lever 32 is moved as far as the position shown by the dashed lines in FIG. 7. Thus, ejector lever 32 is one type of mechanism that permits the cartridge to be positively, mechanically driven at least the first fixed amount shown in FIG. 7. Accordingly, when properly used, ejector lever 32 prevents film from being double exposed.

If, however, the lever 32 is only moved to a position below the position shown by the dashed lines in FIG. 7, the cartridge may be accidentally reloaded because the loading prevention pin 23 has not been permitted to project into the cartridge chamber. In that case, if the cartridge lid 31 is closed, the initial feeding of the film will again be carried out, photography can be performed, and the film may be double exposed.

A refinement of the previously described embodiment further helps prevent double exposure of the film if an ejected cartridge is somehow accidentally reloaded. The refined embodiment operates as follows, with reference to FIGS. 10 and 11 as well as FIGS. 1–9.

The same construction as described in FIGS. 1–9 is used for the refined embodiment of the present invention as well. However, a regulating system, as shown in FIG. 10, operates as follows.

Figure 10:
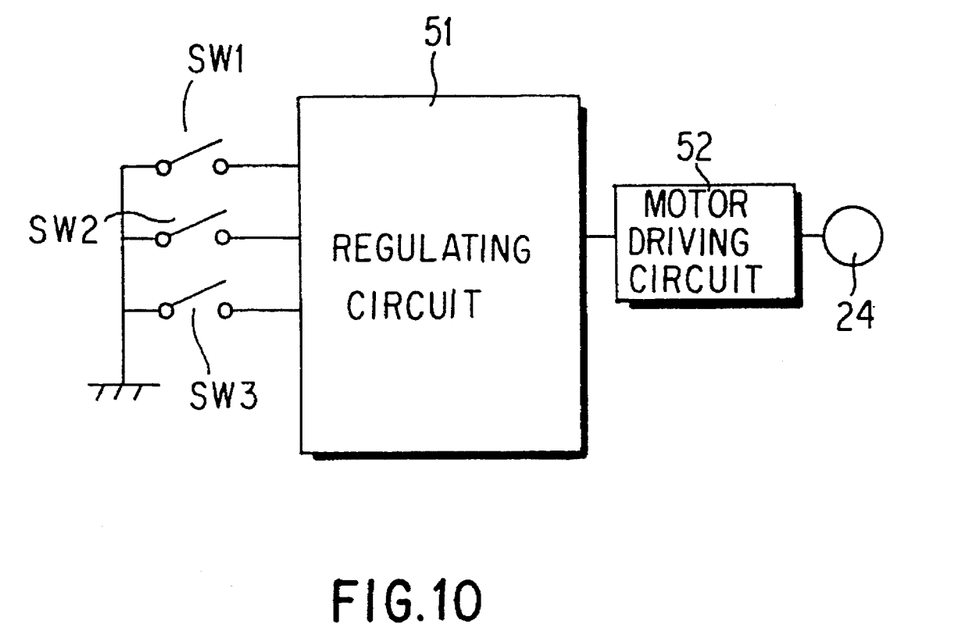
FIG. 10 is a block diagram showing the regulating system of an embodiment of the invention.

With reference to FIG. 10, a regulating circuit 51 has a microchip and peripheral mechanisms such as memory, a counter, and the like. The regulating circuit 51 regulates the operation of the camera 20 according to the flow chart of FIG. 11, which is described hereafter.

Switch SW1 is the operation completion detection switch and switch SW2 is a lid switch that turns on when the film cartridge lid 31 is closed and turns off when the lid 31 is opened. Switch SW3 is a display detection switch that comprises the conductor patterns 27a and 27b and the rubbing brush 28. Switch SW3 is turned on when the indicator mark 12a of the cartridge 10 indicates a "3," showing that the film has been completely used. A motor driving circuit 52 drives the cartridge driving motor 24 to feed the film as well as rewind the film and also causes component 15, and therefore component 17, to rotate in order to adjust the film usage indicator display component.

Figure 11:
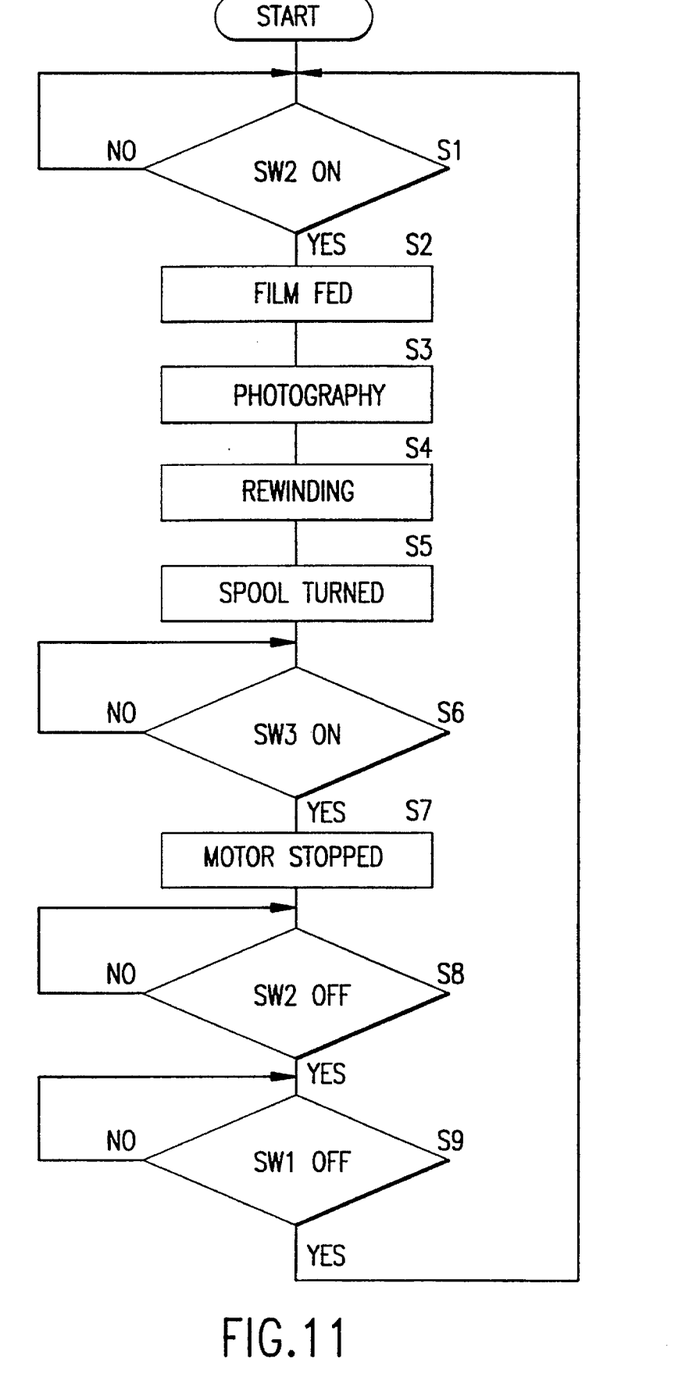
FIG. 11 is a flowchart showing the regulating procedure of the regulating circuit of an embodiment of the invention.

The regulating procedure of the regulating circuit 51 is as follows, with reference to the flow chart of FIG. 11.

The program starts when a battery (not shown) is loaded into the camera 20. First, in step S1, it is determined whether the cartridge lid 31 is closed or opened by whether the lid switch SW2 is on or off. If the switch SW2 is off, it is determined that the lid is opened and the program stays at step S1; if the switch SW2 is on, it is determined that the lid is closed and the program proceeds to step S2. In step S2, the motor 24 is precisely rotated by the motor driving circuit 52, and the film is fed from the cartridge 10 to a winding spool (not shown). A film feeding amount detector (not shown) detects when the film reaches the winding spool.

In step S3, a common photographic procedure is carried out in which the film is wound up the length of one frame onto the winding spool each time a photograph is taken. The details are omitted here. When the photographic procedure is finished, or in other words, when all frames have been photographed, the motor 24 is rotated in reverse in step S4 by the motor driving circuit 52 and the film is rewound into the cartridge 10. The film feeding amount detector detects when the film has been completely rewound into the cartridge 10.

In steps S5–S7, the rotary position of the spool 12 of the cartridge 10 is regulated by the driving component 21 so that the indicator mark 12a of the spool 12 indicates the display symbol 14c ("3"), which also causes non-slanted surface 17b to appear in window 16b. Specifically, in step S5, the cartridge driving motor 24 is rotated in reverse by the motor driving circuit 52 and the spool 12 of the cartridge 10 is rotated in the rewinding direction by the driving component 21. Next, in step S6, the program waits until the indicator mark 12a of the spool 12 is driven to the position that indicates "3," which shows that the film has been completely used, or in other words, until the display detection switch SW3 turns on (i.e, indicating the completion of rewinding), after which the program proceeds to step S7. In step S7, the reverse rotation of the motor 24 by the motor driving circuit 52 stops. At this point, a braking operation such as a short brake or the like stops the motor within a short time interval.

Next, in step S8, it is determined whether the cartridge lid 31 is opened or closed by whether the lid switch SW2 is on or off. If the switch SW2 is off, it is determined that the lid is opened and the program goes to step S9.

If the switch SW2 is on, the program stays at step S8. In step S9, it is determined whether the operation completion detection switch SW1 is on, or in other words, if the ejector lever 32 has been moved to the position shown in FIG. 8. If the switch SW1 is off (i.e., lever 32 moved to the FIG. 8 position), the program returns to step S1; if the switch SW1 is on, the program remains at step S9. If switch SW1 is on, it can be turned off by moving ejector lever 32 to the position shown in FIG. 8. In this instance, switch SW1 being turned off produces a "removed" signal.

According to the procedure described above, the film is rewound into the cartridge 10 when photography of all frames of the film has been completed, and the spool 12 is regulated so that a "3" is indicated, showing that the film is completely used. After the cartridge lid 31 through which the cartridge 10 is to be taken out is opened and the ejector lever 32 is moved through the position shown by the dashed line in FIG. 7 all the way to the position of FIG. 8, the operation completion detection switch SW1 is turned off and the program returns to step S1, and film feeding (initial feeding) becomes possible with the closing action of the cartridge lid 31 (which turns on switch SW2). However, as described previously, since the loading prevention pin 23 is projecting into the cartridge chamber, the reloading of a completely used cartridge once the cartridge has been ejected is prevented, and a double exposure is avoided.

Conversely, if the lid 31 is opened but the ejector lever 32 is not moved all the way to the position shown in FIG. 8, the procedure remains at step S9 and does not return to step S1 because the operation completion detection switch SW1 has not been turned off. Thus the initial feeding of the film is not carried out even if the cartridge lid 31 is closed. Even if the ejector lever 32 is only moved to a position below the position shown by the dashed lines in FIG. 7, a position at which the loading prevention pin 23 does not project into the cartridge chamber, and the cartridge 10 is accidentally reloaded, the initial film feeding of that cartridge 10 will not be carried out and the film will not be double exposed.

When the ejector lever 32 is moved to a position between the position shown by the dashed lines in FIG. 7 and the position of FIG. 8, the loading prevention pin 23 returns to the projected position and prevents reloading, but switch SW1 remains in the on state without ever being turned off. Thus, even if the cartridge 10 is taken out, a separate, unused cartridge loaded, and the cartridge lid 31 closed, the initial feeding of the film will not be carried out. In this case, the initial film feeding can be accomplished by opening the cartridge lid 31, moving the ejector lever 32 to the position of FIG. 8 to turn off switch SW1, reloading the unused cartridge after the operation completion detection switch SW1 has been turned off, and once again closing the cartridge lid 31.

In the refinement of the disclosed embodiment, the spool driving mechanism 100 of FIG. 9 functions as a driving means, the operation completion detection switch SW1 functions as a signal outputting means, and the regulating circuit 51 functions as a regulating means.

While the refined embodiment of the invention was described for a completely used cartridge taken out of the cartridge chamber 22, reloading of a partially used cartridge is prevented in the same way as with a completely used cartridge. If the camera is equipped with a function that performs photography in such a way that a double exposure of the partially used film does not occur, the refined embodiment may be constructed so as to allow reloading of partially used cartridges. In that case, window component 16a, rather than window component 16b, may be used.

The construction is such that if the ejector lever 32 is driven to a position at which the loading prevention pin 23 returns to the projected position, the position shown by the dashed lines in FIG. 7, and then driven a fixed amount further (i.e., to a second fixed position), the switch SW1 will turn off. However, the construction may also be such that the switch SW1 turns off when the lever is driven to the position shown by the dashed lines in FIG. 7. Furthermore, while an example was shown in which the switch SW1 is operated by the ejector lever 32, the construction may alternatively be such that switch is operated by an ejected cartridge or by movement of pin 23 to the projected position. Various alternative constructions of the ejection mechanism are also possible. Therefore, the ejection mechanism is not limited to the ejector lever 32.

Additionally, members other than a pin can be used to prevent insertion of a cartridge by projecting into a cartridge chamber. See, for example, U.S. Pat. Nos. 4,994,833 and 4,994,828.

Since the construction is such that the loading prevention member returns from the retracted position to the projected position whenever a cartridge is ejected by the ejection mechanism more than a fixed amount, when a completely used cartridge is ejected by the ejection mechanism, the loading prevention member returns to the projected position to prevent reloading of the completely used cartridge. Thus, the trouble of performing the ejection action again is eliminated, and use of the camera is made easier. Also, initial feeding will not be carried out again for a completely used cartridge, and double exposure can be prevented.

According to the refined embodiment, when the cartridge is not ejected far enough for the loading prevention member to prevent reloading of the cartridge, the signal outputting device does not change to the "removed" signal output state, which prevents film feeding even if the film cartridge is mistakenly reloaded and lid 31 closed. Therefore double exposure of the film is prevented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera for use with a film cartridge having a film usage indicator movable from a position indicating all of the film in the film cartridge is unexposed to at least one position indicating exposure of at least some of the film in the film cartridge, said camera comprising:

a cartridge chamber for holding the film cartridge;

a loading prevention member that is movable to a first position projecting into said cartridge chamber to prevent loading of the film cartridge with exposed film and that is movable to a second position not projecting into said cartridge chamber when an unused film cartridge is loaded into said cartridge chamber; and an ejection member arranged with respect to the cartridge chamber so that the ejection member can eject from the cartridge chamber a film cartridge held in the cartridge chamber, said ejection member being movable to a position in which the film cartridge is moved to a fixed position enabling said loading prevention member to move to said first position.

2. The camera of claim 1, wherein said loading prevention member is engageable with a component of a film usage indicator of the film cartridge to prevent loading of the film cartridge with exposed film when said loading prevention member is in said first position.

3. The camera of claim 1, wherein said loading prevention member comprises a pin spring biased toward projection into said cartridge chamber.

4. The camera of claim 1, wherein said ejection member comprises an ejection lever accommodated in a space adjacent to said cartridge chamber and mounted for movement in a direction parallel to the direction of insertion of the film cartridge into said cartridge chamber.

5. The camera of claim 4, wherein said ejection lever includes a first leg extending into a lower portion of the cartridge chamber for contacting and ejecting the film cartridge upon movement of said ejection lever in a direction parallel to the direction of insertion of the film cartridge into said cartridge chamber.

6. The camera of claim 4, wherein said ejection lever includes an operational component protruding outside the camera body for moving said ejection lever in a direction parallel to the direction of insertion of the film cartridge into said cartridge chamber upon user activation of the operational component.

7. The camera of claim 5, wherein said ejection lever includes an operational component protruding outside the camera body for moving said ejection lever in a direction parallel to the direction of insertion of the film cartridge into said cartridge chamber upon user activation of the operational component.

8. The camera of claim 1, further comprising:

a driving mechanism that feeds film in the film cartridge through said camera;

a signal outputting device that outputs a removed signal when said ejection member has moved at least to the position in which the film cartridge is moved from a fully loaded position to the fixed position, and outputs an un-removed signal when said ejection member has moved the film cartridge to a position less than said fixed position; and a regulating device that prevents film feeding action by the driving mechanism after rewinding of film until said signal outputting device changes from an un-removed signal output state to a removed signal output state and permits the feeding action of film when said signal outputting device is in a removed signal output state.

9. The camera of claim 8, wherein said signal outputting device outputs said removed signal when said ejection mechanism has moved to a position by which the film cartridge is moved beyond the fixed position.

10. The camera of claim 8, said camera further comprising a contact switch including a fixed contact and a movable contact, and wherein said ejection member includes a surface for contacting and moving said movable contact to open or close said contact switch when said ejection member moves the film cartridge at least to said fixed position, the opening and closing of said contact switch causing said signal outputting device to output the removed signal and the unremoved signal, respectively.

11. The camera of claim 10, wherein said movable contact is biased toward engagement with said fixed contact and said surface moves said movable contact out of engagement with said fixed contact when said ejection member moves the film cartridge at least to said fixed position.

12. A camera for use with a film cartridge having a film usage indicator movable from a position indicating all of the film in the film cartridge is unexposed to at least one position indicating exposure of at least some of the film in the film cartridge, said camera comprising:

a cartridge chamber for holding the film cartridge;

loading prevention means for preventing loading of the film cartridge with exposed film to a fully loaded position by movement of said loading prevention means to a first position projecting into said cartridge chamber and for allowing loading of the film cartridge with unexposed film to the fully loaded position by movement of said loading prevention means to a second position not projecting into said cartridge chamber; and ejection means for ejecting the film cartridge held in the cartridge chamber from the fully loaded position at least to a fixed position at which said loading prevention means moves to said first position.

13. The camera of claim 12, wherein said loading prevention means is engageable with a component of the film usage indicator to prevent loading of the film cartridge with exposed film.

14. The camera of claim 12, wherein said loading prevention means comprises projection means biased toward projection into said cartridge chamber.

15. The camera of claim 12, wherein said ejection means is mounted for movement in a direction parallel to the direction of insertion of the film cartridge into said cartridge chamber.

16. The camera of claim 15, wherein said ejection means includes ejection driving means extending into a lower portion of the cartridge chamber for contacting and ejecting the film cartridge upon movement of said ejection means in a direction parallel to the direction of insertion of the film cartridge into said cartridge chamber.

17. The camera of claim 15, wherein said ejection means includes a user movable operational means protruding outside the camera body for allowing the user to move said ejection means in the direction parallel to the direction of insertion of the film cartridge into said cartridge chamber.

18. The camera of claim 12, further comprising:

driving means for feeding film from the film cartridge through said camera;

signal outputting means for outputting a removed signal when said ejection means ejects the film cartridge from the fully loaded position at least to said fixed position, and outputs an un-removed signal when said ejection means ejects the film cartridge to a position less than said fixed position; and regulating means for preventing film feeding action by the driving means after rewinding of film until said signal outputting means changes from an un-removed signal output state to a removed signal output state to permit the feeding action of film when said signal outputting means is in the removed signal output state.

19. A method of operating a camera designed for use with a film cartridge having a film usage indicator movable from a position indicating all of the film in the film cartridge is unexposed to at least one position indicating exposure of at least some of the film in the film cartridge, said camera including a cartridge chamber for holding the film cartridge in a fully loaded position, a loading prevention member that prevents loading of the film cartridge with exposed film to the fully loaded position by movement of said loading prevention member to a first position projecting into said cartridge chamber and that allows loading of the film cartridge with unexposed film to the fully loaded position by movement of said loading prevention member to a second position not projecting into said cartridge chamber, said loading prevention member in said first position stopping a film cartridge being loaded at a first fixed distance from the fully loaded position, said method comprising the following steps:

contacting the film cartridge in said fully loaded position with an ejection member of said camera; and     physically driving the film cartridge with said ejection member by moving said ejection member while maintaining said ejection member in contact with the film cartridge until the loading prevention member moves to said first position projecting into said cartridge chamber.

20. The method of claim 19, further comprising:

changing an unremoved signal to a removed signal when said ejection member moves said film cartridge at least to said position where said loading prevention member projects into said cartridge chamber; and     preventing film feeding through said camera until the unremoved signal changes to said removed signal after performance of a rewind operation.

* * * * *